(12) United States Patent
Agarwal

(10) Patent No.: US 9,163,689 B2
(45) Date of Patent: Oct. 20, 2015

(54) ELASTOMERIC ARTICLES WITH IMPROVED PROPERTIES

(75) Inventor: Sheel P. Agarwal, Stow, OH (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 61 days.

(21) Appl. No.: 14/122,033

(22) PCT Filed: May 24, 2012

(86) PCT No.: PCT/US2012/039276
§ 371 (c)(1),
(2), (4) Date: Apr. 4, 2014

(87) PCT Pub. No.: WO2012/162462
PCT Pub. Date: Nov. 29, 2012

(65) Prior Publication Data
US 2014/0217656 A1 Aug. 7, 2014

Related U.S. Application Data

(60) Provisional application No. 61/489,309, filed on May 24, 2011.

(51) Int. Cl.
*C08K 3/30* (2006.01)
*C08K 5/09* (2006.01)
*F16F 9/04* (2006.01)
*C08L 11/00* (2006.01)

(52) U.S. Cl.
CPC .............. *F16F 9/0409* (2013.01); *C08L 11/00* (2013.01)

(58) Field of Classification Search
CPC .............................. F16F 9/0409; C08L 11/00
USPC ........................................................ 524/418
See application file for complete search history.

(56) References Cited

U.S. PATENT DOCUMENTS

| | | | |
|---|---|---|---|
| 4,584,350 A | 4/1986 | Davis | |
| 4,839,428 A | 6/1989 | Davis | |
| 4,994,508 A | 2/1991 | Shiraki et al. | |
| 6,858,675 B1 | 2/2005 | Taguchi et al. | |
| 2004/0063820 A1 | 4/2004 | Karol et al. | |
| 2004/0071984 A1 | 4/2004 | Telang | |
| 2008/0111288 A1* | 5/2008 | Howard et al. | 267/64.27 |

OTHER PUBLICATIONS

Laakso, et al. "Recent Advances in Chlorinated Polyethylene Technology for Thermoset Elastomer Applications" Fall 170th Technical Meeting of the Rubber Division, American Chemical Society, Paper No. 79, pp. 1-25 (Oct. 10-12, 2006).
Laakso, et al. "Advances in Tyrin Chlorinated Polyethylene (CM) Technology for Thermoset Applications" Fall 170th Technical Meeting of the Rubber Division of the American Chemical Society, Paper No. 48, pp. 1-36 (Oct. 16-18, 2007).
Product Information, "TYRIN Chlorinated Polyethylene: A guide to Compounding with Tyrin" The Dow Chemical Company, Form No. 776-00021-1005, pp. 1-6 (2005).
Product Information, "TYRIN Chlorinated Polyethylene: Chemical Resistance Summary of Tyrin Chlorinated Polyethylene Elastomers" The Dow Chemical Company, Form No. 776-00023-1005, pp. 1-15 (2005).
Laasko, R. "Generalized Chemical Structure of TYRIN Chlorinated Polyethlyene" Dow Chemical Company, pp. 1-2 (Oct. 2008).

* cited by examiner

*Primary Examiner* — Hui Chin
(74) *Attorney, Agent, or Firm* — Jason A. Houser; Arthur M. Reginelli

(57) ABSTRACT

An air spring having an airsleeve, wherein at least one layer of said airsleeve includes the vulcanization product of a composition that includes an unsaturated chlorinated polymer; and a saturated chlorinated polymer.

17 Claims, 4 Drawing Sheets

ELASTOMERIC ARTICLES WITH IMPROVED PROPERTIES

This application is a national-stage application of International Application Serial No. PCT/US2012/039276, filed May 24, 2012, which claims the benefit of U.S. Provisional Application Ser. No. 61/489,309, filed May 24, 2011, which are incorporated herein by reference.

FIELD OF THE INVENTION

Embodiments of the present invention are directed toward elastomeric articles, and more particularly the bellows of air springs, that have improved properties including flex fatigue and crack growth resistance.

BACKGROUND OF THE INVENTION

Air springs, or pneumatic suspension devices, have long been used to isolate road disturbances from a vehicle, seat, or cab. An air spring, as part of a vehicle's suspension, supports the vehicle's load or mass at each axle. Typically, each axle of a vehicle associated with an air spring supports the mass component or load carried by the axle. In addition, there may be ancillary air springs that support driver comfort in and around the driver's compartment, or cab. In an air spring, a volume of gas, usually air, is confined within a flexible container. As an air spring is compressed (jounce travel), the pressure of the gas within the air spring increases; and as an air spring extends (rebound travel), the pressure of the gas within the air spring decreases. Road disturbances are mainly absorbed by this compression and extension of the air springs as a function of work ($w=\int F \cdot dx$). Air springs are often engineered to have a specific spring rate or spring constant, thereby controlling jounce and rebound characteristics for the desired application and for comfort.

Elastomeric articles such as air springs may undergo countless cycles between compression and extension, and must be flexible and durable. Over time and under operational stresses, the material properties of an airsleeve will change. Eventually, cracks may form and become sufficiently large so that the integrity of the airsleeve is challenged, requiring replacement.

Typically, the air spring bellows or airsleeve is made of cord-(fabric or metal) reinforced rubber compositions, which may be natural or synthetic materials. Unsaturated, chlorinated rubber such as neoprene, which is sometimes referred to as chloroprene rubber (CR), is often used due to its relatively low compression set, good resilience and abrasion resistance.

Saturated chlorinated polyethylene (CPE) has been used in various automotive and industrial rubber parts for its properties of heat, weather, and oil resistance. Commercially available from Dow Chemical Company under the tradename TYRIN®, CPE has been used in automotive wire and cable jacketing, hose and tubing, and industrial hoses. Product literature for TYRIN® CPE states that the molecular saturation of the CPE requires the use of vulcanization systems other than conventional sulfur systems. Furthermore, particular care must be taken in the selection of additives when compounding CPE, because additives that are beneficial in one cure system can be detrimental in another.

There remains a need in the market for compositions for airsleeve having improved properties, including shorter cure cycle, improved filler dispersion, and improved resistance to cracking and flex fatigue.

SUMMARY OF THE INVENTION

In one or more embodiments, the present invention provides an air spring having an airsleeve, wherein at least one layer of said airsleeve includes the vulcanization product of a composition that includes an unsaturated chlorinated polymer; and a saturated chlorinated polymer.

In one or more embodiments, the present invention provides an air bellow prepared by a process comprising the steps of i. preparing a vulcanizable composition that includes an unsaturated chlorinated polymer, and a saturated chlorinated polymer; ii. fabricating the vulcanizable composition into an uncured air bellow; and iii. at least partially curing the uncured air bellow.

DETAILED DESCRIPTION OF ILLUSTRATIVE EMBODIMENTS

Embodiments of the present invention are based upon the discovery that technologically useful air bellows can be manufactured from compositions that include saturated and unsaturated chlorinated polymers. In one or more embodiments, at least one layer of an air bellow is manufactured from polymer compositions that include saturated chlorinated polymer and unsaturated chlorinated polymer. It has unexpectedly been discovered that air bellows prepared according to the present invention have an overall advantageous balance of properties including improved flexibility and durability.

Figure 1:
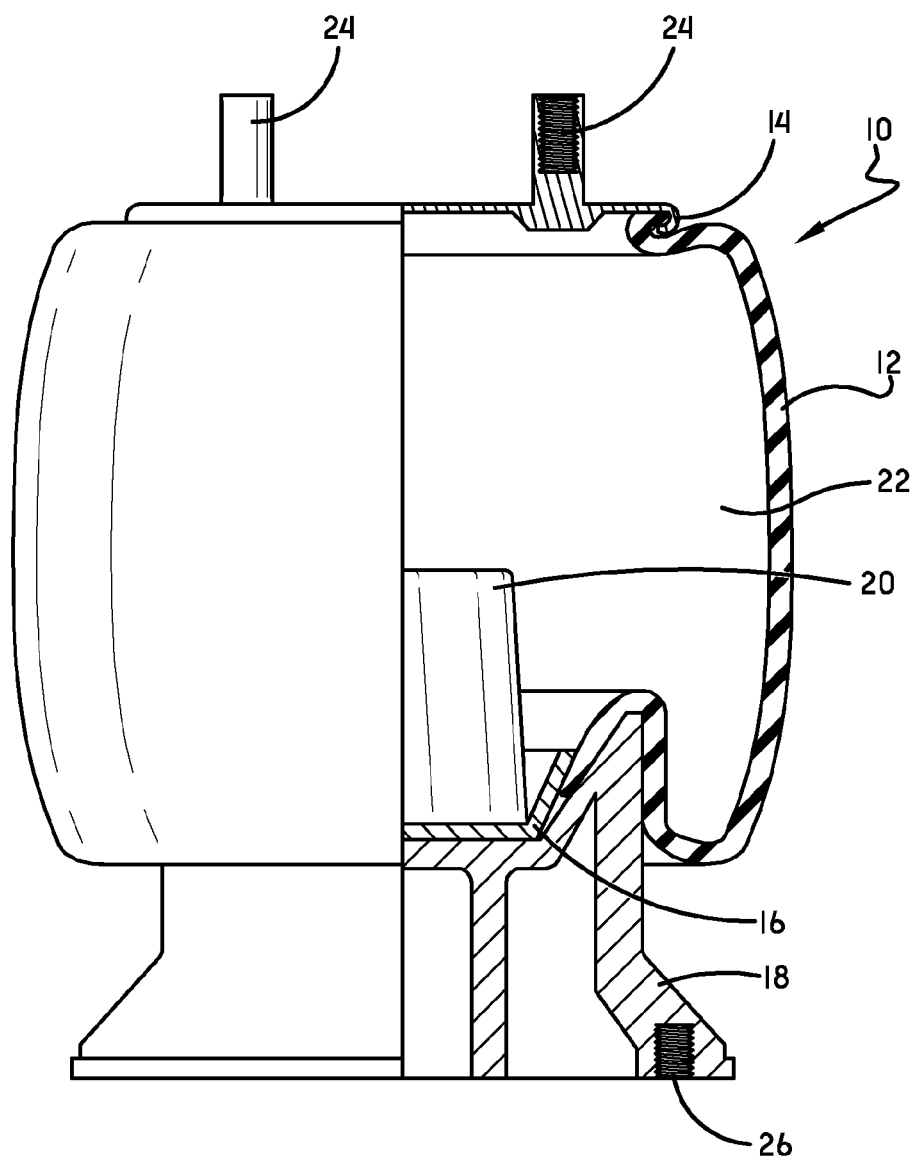
FIG. 1 is a perspective view of an exemplary air spring according to one or more embodiments of the present invention.

The figures show various embodiments of air springs. In FIG. 1, an air spring assembly is designated generally by the numeral 10. The air spring assembly 10 includes flexible airsleeve 12, which may also be referred as bellow 12. Bead plate 14 is crimped to airsleeve 12 to form an airtight seal between bead plate 14 and airsleeve 12. Similarly, end closure 16 is molded to flexible airsleeve 12 to form an airtight seal between end closure 16 and airsleeve 12. End closure 16 of airsleeve 12 is affixed to piston 18 by mechanical means well known in the art, including, for example, a piston bolt (not shown). Piston 18 provides a surface for flexible airsleeve 12 to roll on during compressive (jounce) travel. Flexible air spring assembly 10 may optionally include bumper 20 to support the vehicle when there is no air in the air springs or during extreme road disturbances. Enclosed within airsleeve 12 is a volume of gas 22. Studs 24 and hole 26 are used to secure the flexible air spring assembly 10 to the mounting surface of an automobile (not shown).

Figure 2:
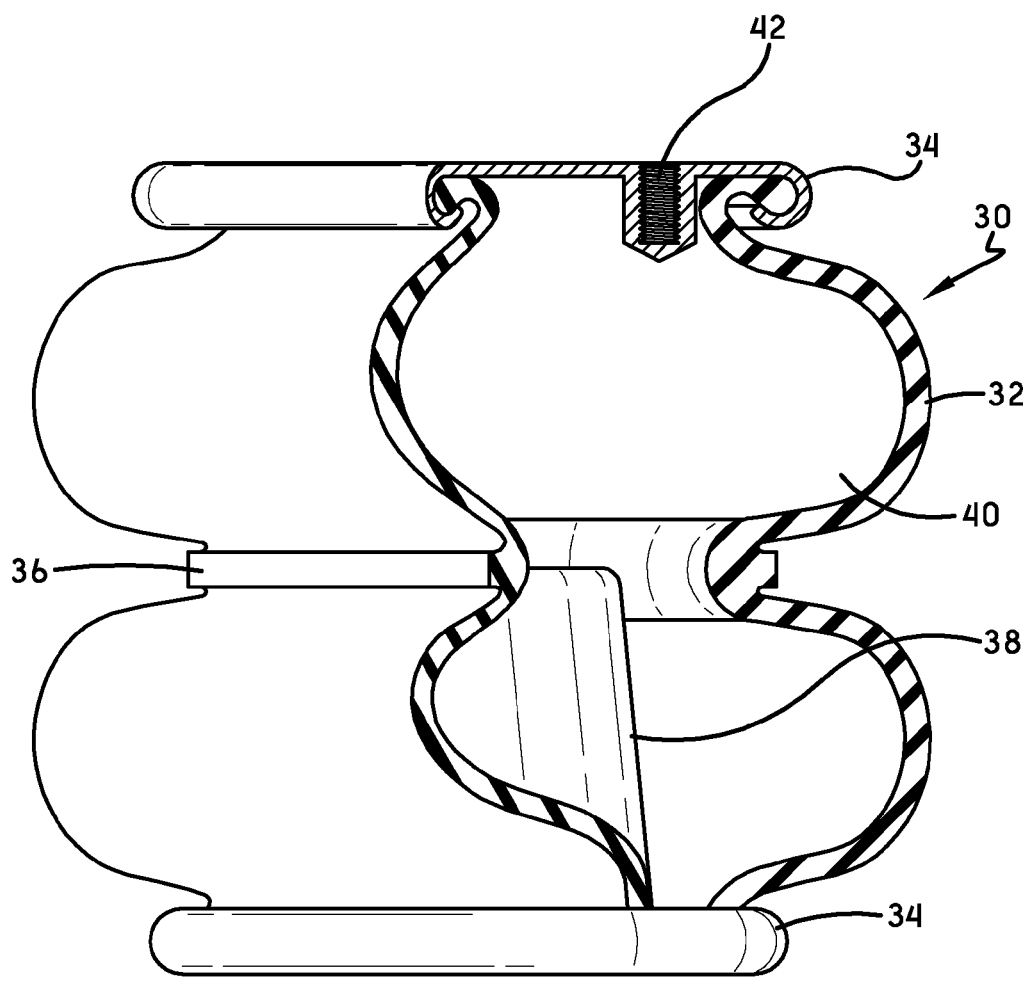
FIG. 2 is a perspective view of an exemplary air spring according to one or more embodiments of the present invention.

FIG. 2 shows an exemplary (double) convoluted air spring assembly designated generally by the numeral 30. Convoluted air spring assembly 30 includes flexible airsleeve 32. Bead plates 34 are crimped to airsleeve 32 to form an airtight seal between bead plates 34 and airsleeve 32. A girdle hoop 36 is affixed to airsleeve 32 between bead plates 34. Convoluted air spring assembly 30 may optionally include bumper 38 to support the vehicle when there is no air in the air springs or during extreme road disturbances. Enclosed within airsleeve 32 is a volume of gas 40. Blind nuts, including 42 and other blind nuts (not shown), are used to secure the convoluted air spring assembly 30 to the mounting surface of an automobile (not shown).

Figure 3:
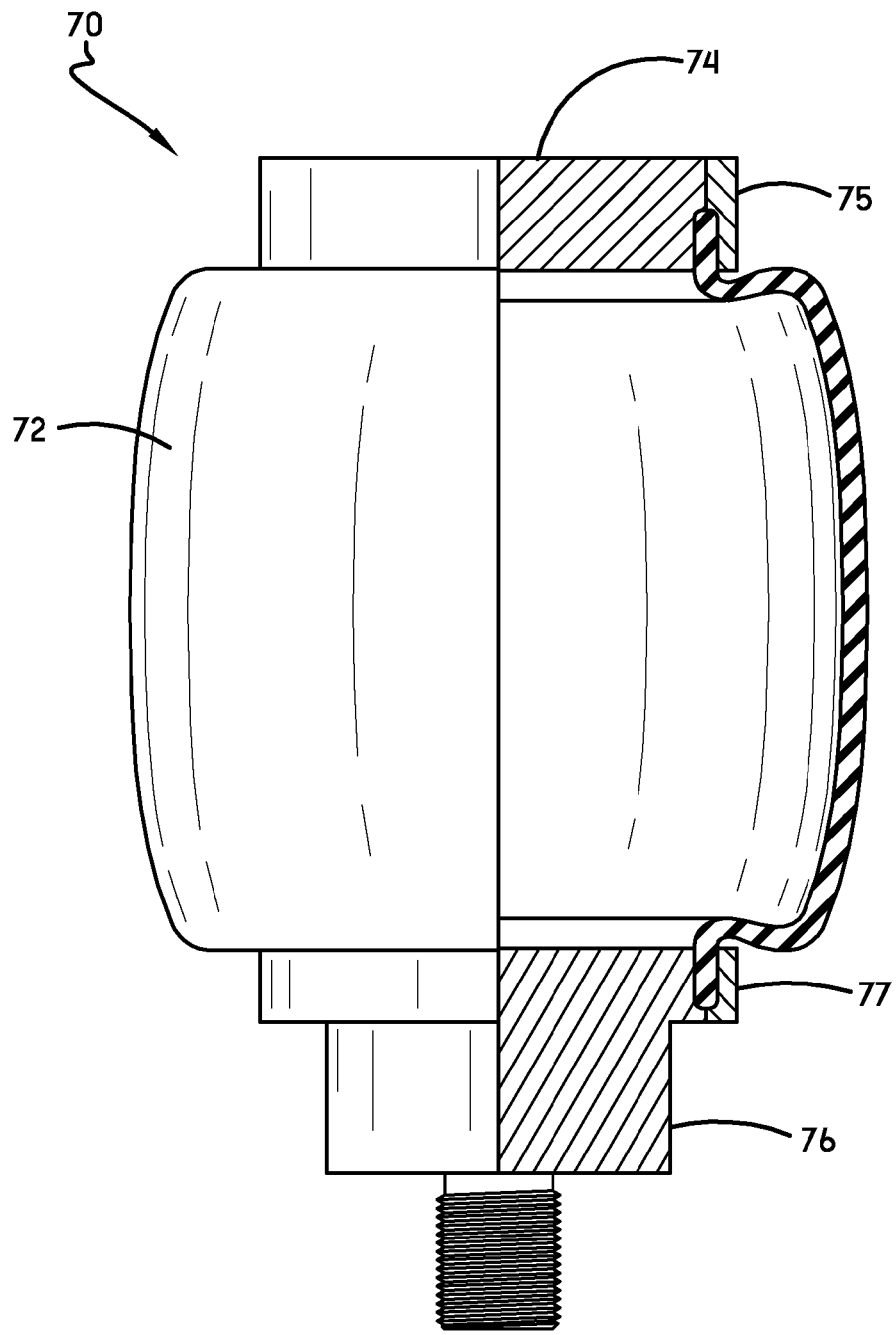
FIG. 3 is a perspective view of an exemplary air spring according to one or more embodiments of the present invention.

FIG. 3 shows an exemplary cab/seat spring assembly designated generally by the numeral 70. Cab/seat spring assembly 70 includes flexible air sleeve 72. Cab/seat plate 74 is attached to air sleeve 72 to form an air tight seal there between by using, for example, metal ring 75. An airtight seal can be made using known techniques such as those described in U.S. Pat. No. 6,474,630, which is incorporated herein by reference. Suspension plate 76 is likewise secured to airsleeve 72 via metal ring 77 to form an airtight seal there between.

Figure 4:
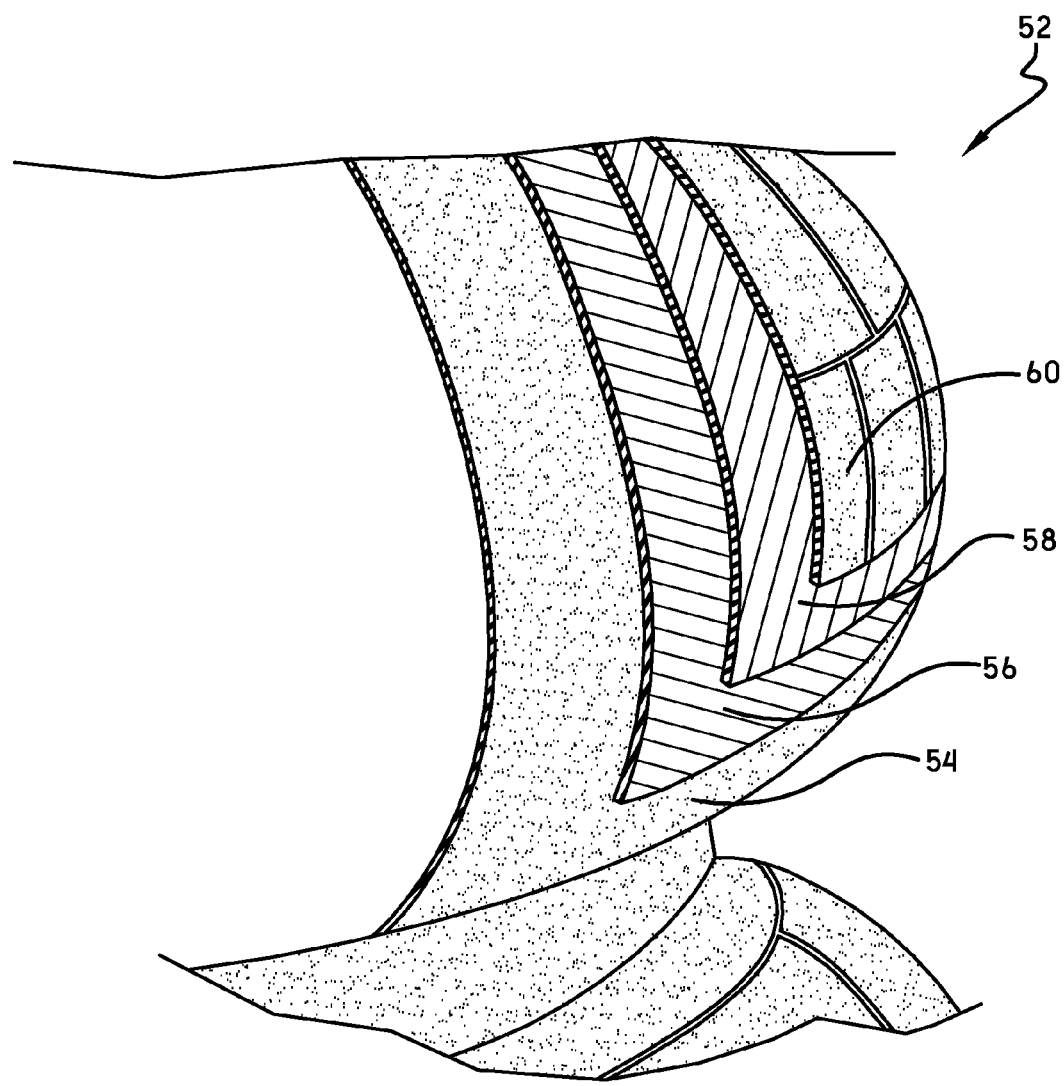
FIG. 4 is a cutaway view of an exemplary airsleeve showing its layered construction.

In one or more embodiments, airsleeves 12, 32, and 72 are made of cord- (fabric or metal) reinforced elastomer and may be comprised of several layers, as shown in a cutaway view of an exemplary airsleeve 52 in FIG. 4. Exemplary airsleeve 52 features "two-ply" construction and includes four layers including: innerliner 54, first ply 56, second ply 58, and outer cover 60. Innerliner 54 and outer cover 60 may include calendared rubber. As shown, first ply 56 may include a single ply of cord-reinforced elastomer with the cords at a specific bias angle, and second ply 58 may include a single ply of fabric-reinforced elastomer with the same bias angle laid opposite that of first ply 56.

While the present invention is described in the context of an airsleeve and an air spring used in the suspension of an automobile, one of skill in the art will appreciate that the teachings disclosed are general and the present invention may be applied to other art relating to the air spring areas. The other areas might include, for example, air springs for seats, air springs used to support truck cabs, air springs used with buses, hoses and the like.

One or more embodiments of the present invention are directed toward elastomeric compositions, which may also be referred to as vulcanizable compositions, that are useful in the manufacture of one or more layers of an air spring bellow.

The bellows of the present invention are prepared by curing a vulcanizable composition that includes a saturated chlorinated polymer and an unsaturated chlorinated polymer. Cure systems for vulcanization may include sulfur-based cure systems. Other ingredients that may be included in the vulcanizable formulation include additional elastomers, plasticizers, antioxidants, fillers, oils, curatives, and other additives that are conventionally employed in rubber compositions.

In one or more embodiments, the vulcanizable composition comprises a saturated chlorinated polymer. Examples of saturated chlorinated polymers include chlorinated polyolefins. Chlorinated hydrogenated polydienes are also useful.

Typically, saturated chlorinated polymers include a saturated hydrocarbon polymer backbone with chlorine atoms distributed along the polymer chain. Generally, saturated chlorinated polyolefins may be described as having a saturated methylene backbone with chlorine atoms distributed along the methylene chain. Saturated chlorinated polyolefins are sometimes referred to by those of skill in the art as saturated chlorinated elastomers.

In one or more embodiments the saturated chlorinated polymer is saturated chlorinated polyethylene, which may also be referred by its ASTM designation CM, or by the acronym CPE.

In one or more embodiments, the saturated chlorinated polymer includes from about 1 to about 50 percent by weight (wt. %), in other embodiments, from 5 to about 48 wt. %, in other embodiments, from about 10 to about 45 wt. %, in other embodiments, from about 20 to about 44 wt. %, in other embodiments, from about 25 to about 42 wt. % of chlorine, and in other embodiments, from about 30 to about 40 wt. % of chlorine, based upon the total weight of the saturated chlorinated polymer.

In one or more embodiments, the saturated chlorinated polymer includes less than about 1 wt. % sulfur, in other embodiments less than 0.5 wt. % sulfur, in yet other embodiments, less than 0.1 wt. % sulfur, based upon the total weight of the saturated chlorinated polymer. In one or more embodiments, the saturated chlorinated polymer is devoid of sulfur.

In one or more embodiments, saturated chlorinated polymer employed in the practice of this invention may be characterized by a Mooney viscosity ($ML_{1+4}$ at 100° C.) of at least 25, in other embodiments at least 40, in other embodiments at least 50, in other embodiments at least 55, and in other embodiments at least 60. In these or other embodiments, the saturated chlorinated polymer may be characterized by a Mooney viscosity of less than 150, in other embodiments less than 130, in other embodiments less than 120, and in other embodiments less than 100. In one or more embodiments, the saturated chlorinated polymer may be characterised by a Mooney viscosity (ML 1+4/100° C.) of from about 40 to about 130, in other embodiments from about 50 to about 110, and in other embodiments from about 60 to about 100.

Saturated chlorinated polyethylene polymers are commercially available, for example from Dow Chemical Company, under the trade name Tyrin®. Examples of Tyrin® products include Tyrin® CM 3551E, which contains approximately 35-36 wt. % of chlorine and has a Mooney viscosity of about 90-94, Tyrin® XUS 63010, which contains approximately 36 wt. % of chlorine and has a Mooney viscosity of about 80, Tyrin® CM 302, which contains approximately 30 wt. % of chlorine and has a Mooney viscosity of about 60-65, Tyrin® XUS 63008, which contains approximately 35 wt. % of chlorine and has a Mooney viscosity of about 100, and Tyrin® CM 4211P, which contains approximately 42% by weight of chlorine and has a Mooney viscosity of about 80.

In one or more embodiments, the vulcanizable composition further comprises unsaturated chlorinated polymer. Examples of unsaturated chlorinated polymer include polymers that derive from the polymerization of halogenated dienes and optionally monomer copolymerizable therewith. A popular halogenated diene is 2-chloro-1,3-butadiene, which is also known as chloroprene. Monomer copolymerizable with chloroprene includes sulfur and 2,3-dichloro-1,3-butadiene. Homopolymers of chloroprene are generally referred to as polychloroprene. For purposes of this description, the polymers deriving from the copolymerization of chloroprene and monomer copolymerizable therewith may be referred to as polychloroprene copolymers.

In one or more embodiments, polychloroprene or polychloroprene copolymers employed in the practice of this invention may be characterized by a Mooney viscosity ($ML_{1+4}$ at 100° C.) of at least 25, in other embodiments at least 40, in other embodiments at least 60, in other embodiments at least 80, and in other embodiments at least 100. In these or other embodiments, the polychloroprene or polychloroprene copolymers may be characterized by a Mooney viscosity ($ML_{1+4}$ at 100° C.) of less than 150, in other embodiments less than 130, in other embodiments less than 110 in other embodiments less than 80, in other embodiments less than 60, and in other embodiments less than 50. In particular embodiments, the polychloroprene or polychloroprene copolymers may be characterized by a Mooney viscosity ($ML_{1+4}$ at 100° C.) of from about 100 to about 120, and in other embodiments from about 41 to about 51.

In one or more embodiments, blends of distinct polychloroprene or polychloroprene copolymers may be employed to achieve a desirable balance of properties. These distinctions may be based upon comonomer content and/or viscosity of the polymers.

Examples of polychloroprene or polychloroprene copolymers are available from DuPont Performance Elastomers (Wilmington, Del.) under the Neoprene™ "W" type family designations.

A. Optional Additional Elastomers

In one or more embodiments, the vulcanizable composition may optionally include additional elastomers, which refers to other polymers that could form part of the elastomeric network. As those skilled in the art appreciate, exemplary polymers include natural rubber, synthetic polyisoprene, polybutadiene, polyisobutylene-co-isoprene, polychloroprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, nitrile rubber, silicone rubber, epichlorohydrin rubber, and mixtures thereof.

In one or more embodiments, the vulcanizable composition of this invention may include an antioxidant. Useful antioxidants include bisphenol type antioxidants, diphenylamines, and zinc salts. Useful diphenylamine antioxidants are available under the tradename 405 (Akrochem). Useful zinc salt antioxidants are available under the tradename 58 (Akrochem).

Antidegradant protect the final product vulcanizate against damaging external influences such as oxidation, ozone, heat, and dynamic stresses. A suitable antidegradant is Wingstay 100, which is a mixed diaryl-p-phenylene type antidegradant. Another suitable antidegradant is Wingstay 29, which is a mixed para oriented styrenated diphenylamine. Wingstay 100 and Winstay 29 are commercially available.

Another suitable antidegradant is IPPD, or N-isopropyl-N'-phenyl-p-phenylenediamine. IPPD is available through Flexsys (Akron, Ohio) under the tradename Santoflex IPPD.

Another suitable antidegradant is 6PPD, or N-(1,3-dimethylbutyl)-N-phenyl-p-phenylenediamine. 6PPD is available through Flexsys (Akron, Ohio) under the tradename Santoflex 6PPD.

In one or more embodiments, the vulcanizable composition of this invention may include carbon black. Carbon black is virtually pure elemental carbon in the form of colloidal particles that are produced by incomplete combustion or thermal decomposition of gaseous or liquid hydrocarbons under controlled conditions. Carbon black may be added to the vulcanizable composition as a reinforcing filler to achieve the required balance of processability, hardness and tensile or tear properties. Generally, any conventional carbon black, or blends of the same, used in compounding rubber-based airsleeve formulations is suitable for use in the present invention. Particularly useful carbon black varieties include those conforming to the characteristics of ASTM N660.

In one or more embodiments, the vulcanizable composition of this invention may include silica. Useful forms of silica (silicon dioxide) include crystalline and amorphous silica. The crystalline form of silica includes quartz, tridymite and cristobalite. Amorphous silica may occur when the silicon and oxygen atoms are arranged in an irregular form as identified by X-ray diffraction. In one or more embodiments, the silica is a precipitated silica. In these or other embodiments, fumed silica is employed. Commercially available forms of silica are available from PPG Industries, Inc. (Monroeville, Pa.), Degussa Corporation (Parsippany, N.J.) and J. M. Huber Corporation (Atlanta, Ga.). One useful commercial product is Rubbersil® RS-150, which is characterized by a BET surface area of 150 $m^2/g$, tapped density of 230 g/liter, pH (5% in water suspension) of 7, $SiO2$ content of 98%, $Na_2SO_4$ content of 2%, and $Al_2O_3$ content of 0.2%.

Other organic fillers include coal filler and ground recycled rubber. Other useful inorganic fillers include clays, talc, mica, titanium dioxide, and calcium carbonate. Useful clays include hydrated aluminum silicates.

In one or more embodiments, the vulcanizable composition of this invention may include low oil swell factices, or vulcanized oils. In specific embodiments, these compounds include sulfur vulcanized vegetable oils. These factices decrease compound nerve and may permit higher liquid plasticizer levels. Factices may also speed the incorporation of fillers and increase milling efficiency. A suitable factice is commercially available from Akrochem Corporation (Akron, Ohio) under the Akrofax tradename.

In one or more embodiments, plasticizers, which may also be referred to as softeners, include, but are not limited to, fatty acids, vegetable oils, petroleum products, coal tar products, pine products, esters, and resins. In particular embodiments, the plasticizers include esters such as dicapryilphthalate, butylcuminate, dibutylphthalate, butyllactate, glycerol chlorobenzoate, methylricinoleate, octyloleate, dioctylphthalate, or dioctylsebacate.

In one or more embodiments, the vulcanizable compositions of this invention may include a tackifier or tackifier resin. As is known in the art, these resins generally increase the tackiness of the composition. Natural or synthetic resins may be employed. In particular embodiments, a nitrile rubber latex is employed as a tackifier. In these or other embodiments, the tackifier may include Koresin (BASF), which is believed to be a resin of acetylene and p-t-butylphenol.

In one or more embodiments, the vulcanizable composition of this invention may include wax. Wax is a processing aid and serves as a release agent.

In one or more embodiments, the vulcanizable composition of this invention may include a low viscosity polyethylene wax. Low viscosity polyethylene wax is a release, or antisticking, agent. A useful low viscosity polyethylene wax is available from Akrochem Corporation (Akron, Ohio) under the PE-100 tradename.

In one or more embodiments, the vulcanizable composition of this invention may include a homogenizing agent. Useful homogenizing agents include Strucktol 60NS, which is a mixture of aliphatic hydrocarbon resins.

In one or more embodiments, the vulcanizable composition of this invention includes a curative, or cure package. Advantageously, and contrary to conventional wisdom, peroxide curatives, which are known to produce unwanted volatile by-products, can be avoided. Curatives based upon thiadiazole, which are known to have shorter scorch times, can also be avoided.

It has been found that CPE-containing vulcanizable formulations can be cured with non-peroxide, non-thiadiazole, sulfur-based curatives to produce airsleeves having advantageous properties. The cure package includes a sulfur-based compound and may also include other optional ingredients. In one or more embodiments, the cure package includes a sulfur-based compound and one or more additives. Although one having skill in the art may appreciate other possible cure packages, an exemplary cure package includes sulfur, tetramethylthiuram disulfide (TMTD) or tetramethylthiuram monosulfide (TMTM), and zinc oxide.

Sulfurs that are soluble or insoluble in elastomers may be used. Exemplary sulfur is Crystex OT 20, polymeric sulfur that is insoluble in elastomers. At vulcanization temperatures, Crytex OT 20 de-polymerizes to soluble sulfur and behaves similarly to what is traditionally known as "rubber maker's sulfur" and fosters the crosslinking of polymer molecules. Crystex OT 20 is commercially available from Flexsys (Akron, Ohio).

TMTD and TMTM are cure accelerants that increase the rate of cure by catalyzing the addition of sulfur chains to the rubber molecules. TMTD is commercially available from Western Reserve Chemical Corporation (Stow, Ohio). Suitable accelerants also include other accelerators known in the art.

Zinc oxide acts as a cure activator in the presence of sulfur, one or more accelerators, and unsaturated rubber to help promote the formation of sulfur cross-links during the vulcanization process.

In one or more embodiments, the cure system includes one or more cure retarders, which serve to slow the cure rate and ideally provide a marching cure profile. In particular embodiments, the cure rate of the inner and outer layers is slowed to match the cure rate of the core (i.e., cord-containing) layers. In one or more embodiments, the vulcanizable compositions of this invention are manipulated to achieve a $t_{50}$ of from about 5 to about 20 minutes, in other embodiments from about 7.5 to about 19 minutes, in other embodiments from about 10 to about 18 minutes, at 155° C. as determined by standard techniques using a moving die rheometer (MDR). In these or other embodiments, the vulcanizable compositions of this invention are manipulated to achieve a $t_{90}$ of from about 20 to about 45 minutes, or in other embodiments from about 21 to about 40 minutes, in other embodiments from about 25 to about 38 minutes at 155° C. In these or other embodiments, the vulcanizable compositions of this invention are manipulated to achieve a $t_{100}$ of at least 30 minutes.

In one or more embodiments, the vulcanizable composition of this invention may include stearic acid. Stearic acid (octadecanoic acid) is a waxy solid and has the chemical formula $C_{18}H_{36}O_2$. Stearic acid is particularly effective as a processing aid in minimizing mill and calendar roll sticking.

In one or more embodiments, the vulcanizable composition of this invention may include magnesium oxide (MgO). The primary function of magnesium oxide is to neutralize trace hydrogen chloride that may be liberated by the polymer during processing, vulcanization heat aging or service. By removing the hydrogen chloride, magnesium oxide prevents auto-catalytic decomposition resulting in greater stability. Magnesium oxide may also take part in the crosslinking process.

One or more amounts are based upon a parts per hundred rubber (phr) unit of measure. As is conventional in the art, the rubber component of the composition refers to the elastomer system or elastomeric component of the vulcanizable composition, or in other words, the rubber component includes those polymers that, upon vulcanization, form part of the elastomeric network.

In one or more embodiments, the rubber component of the vulcanizable composition includes at least about 70 parts chlorinated polymer per hundred parts rubber (phr), in other embodiments at least 75, in yet other embodiments at least 80, in other embodiments at least 85, in yet other embodiments at least 90 phr chlorinated polymer. In one or more embodiments, the rubber component of the vulcanizable composition includes less than about 100 parts chlorinated polymer phr, in other embodiments less than about 95, in yet other embodiments less than about 90, in other embodiments less than about 85 parts chlorinated polymer phr.

In one or more embodiments, the vulcanizable composition comprises greater than about 5 parts saturated chlorinated polymer per hundred rubber (phr), in other embodiments greater than 7 phr, in yet other embodiments, greater than 10 phr, in other embodiments greater than 12 phr, in yet other embodiments, greater than 15 phr saturated chlorinated polymer. In one or more embodiments, that vulcanizable composition comprises less than about 50 parts saturated chlorinated polymer per hundred rubber (phr), in other embodiments less than about 45 phr, in yet other embodiments, less than about 40 phr, in other embodiments less than about 30 phr, in yet other embodiments, less than about 25 phr saturated chlorinated polymer. In one or more embodiments, the vulcanizable composition comprises from about 5 to about 30 phr of a saturated chlorinated polymer.

In one or more embodiments, the vulcanizable composition may include limited amounts of chlorosulfonated polyethylene (CSM). In one or more embodiments, the rubber component of the vulcanizable composition includes less than about 100 parts CSM phr, in other embodiments less than about 5, in yet other embodiments less than about 2, in other embodiments less than about 1 parts chlorinated polymer phr. In one or more embodiments, the vulcanizable composition is devoid of CSM.

In one or more embodiments, the weight ratio of saturated to unsaturated chlorinated polymer may be from about 1:20 to about 1:1, in other embodiments from about 1:10 to about 1:2, and in other embodiments from about 1:7.5 to about 1:3.5.

In one or more embodiments, the vulcanizable compositions may include at least 7 parts by weight (pbw), in other embodiments at least 10 pbw, and in other embodiments at least 12 pbw plasticizer, based on 100 parts by weight rubber (phr). In these or other embodiments, the vulcanizable compositions may include less than 25 pbw, in other embodiments less than 20 pbw, and in other embodiments less than 18 pbw plasticizer phr. In these or other embodiments, the vulcanizable compositions include from about 7 to about 22 weight %, in other embodiments from about 10 to about 20 pbw, and in other embodiments from about 12 to about 17 pbw plasticizer, based on 100 parts by weight rubber (phr).

In one or more embodiments, the vulcanizable composition may include at least about 20, in other embodiments at least about 30, and in other embodiments at least about 40 pbw carbon black phr. In one or more embodiments, the vulcanizable composition may include less than about 100, in other embodiments less than about 75, and in other embodiments less than about 50 pbw carbon black phr.

In one or more embodiments, the vulcanizable composition may include at least 15, in other embodiments at least 20, and in other embodiments at least 25 pbw silica phr. In one or more embodiments the vulcanizable composition may include less than 250, in other embodiments less than 200, in other embodiments less than 90, and in other embodiments less than 80 pbw silica phr. Where both carbon black and silica are employed, the weight ratio of carbon black to silica may range from 9:1 to 0.5:1, in other embodiments from 5:1 to 1:1, and in other embodiments from 4:1 to 2:1.

In certain embodiments, the vulcanizable composition of this invention is devoid of factice. In one or more embodiments, the vulcanizable composition may include at least about 1, in other embodiments at least about 2, and in other embodiments at least about 3 pbw factice phr. In one or more embodiments, the vulcanizable composition may include less than about 10, in other embodiments less than about 8, and in other embodiments less than about 6 pbw factice phr.

Optionally, the vulcanizable composition of this invention may include 1 part by weight or more, in other embodiments at least 2 parts by weight, in other embodiments at least 4 parts by weight, in other embodiments at least 5 parts by weight, in other embodiments at least 6 parts by weight, in other embodiments at least 7 parts by weight, in other embodiments at least 8 parts by weight, in other embodiments at least 9 parts by weight, and in other embodiments at least 10 parts by weight tackifier resin phr.

In these or other embodiments, the vulcanizable composition may include less than 20 pbw, in other embodiments less than 18 pbw, in other embodiments less than 16 pbw, in other embodiments less than 14 pbw, and in other embodiments less than 12 pbw tackifier phr.

In certain embodiments, the vulcanizable composition of this invention optionally includes at least 1 part by weight, in other embodiments at least 2 parts by weight, in other embodiments at least 4 parts by weight, in other embodiments at least 5 parts by weight, in other embodiments at least 6 parts by weight, in other embodiments at least 7 parts by weight, in other embodiments at least 8 parts by weight, in other embodiments at least 9 parts by weight, and in other embodiments at least 10 parts by weight homogenizing agent phr.

In these or other embodiments, the vulcanizable composition may include less than 20 pbw, in other embodiments less than 18 pbw, in other embodiments less than 16 pbw, in other embodiments less than 14 pbw, and in other embodiments less than 12 pbw homogenizing agent phr.

Those skilled in the art will be able to select an appropriate amount of the sulfur-based curative and complementary cure agents in order to achieve a desired level of cure. In one or more embodiments, the amount of sulfur is at least 0.1 phr, in other embodiments, at least 0.5 phr. In one or more embodiments, the amount of sulfur is less than 8 phr, in other embodiments, less than 5 phr.

In one or more embodiments, the amount of zinc oxide is at least 0.5 phr, in other embodiments, at least 0.75 phr, in other embodiments, at least 1 phr, and in other embodiments, at least 2 phr. In one or more embodiments, the amount of zinc oxide is less than 8 phr, in other embodiments, less than 5 phr, in other embodiments, less than 4 phr, in other embodiments, less than 3 phr, and in other embodiments, less than 2 phr. In one or more embodiments, the amount of zinc oxide is from about 1 to about 3 phr, in other embodiments, the amount of zinc oxide is from about 0.5 to about 2 phr.

In one or more embodiments, the amount of antioxidants is from about 1 to about 5 phr. In one or more embodiments, the amount of antiozonants is from about 1 to about 5 phr. In one or more embodiments, the amount of accelerators is from about 0.1 to about 4 phr.

The compositions for preparing one or more layers of airsleeve according to the present invention can be prepared by conventional means using conventional rubber compounding equipment such as Brabender, Banbury, Werner-Pfleiderer, Sigma-blade mixer, two-roll mill, or other mixers suitable for forming viscous, relatively uniform admixtures. Mixing techniques depend on a variety of factors such as the specific types of polymers used, and the fillers, processing oils, waxes, and other ingredients used. In one or more embodiments, the ingredients can be added together in a single stage. In other embodiments, some of the ingredients such as saturated chlorinated polymer, carbon black, etc. can be first loaded followed by the unsaturated polymer. In other embodiments, a more conventional manner can be employed where the unsaturated polymer is added first followed by the other ingredients. In even other embodiments, the unsaturated polymer may be added at the same time as the saturated polymer.

Mixing cycles generally range from about 2 to 10 minutes. In certain embodiments an incremental procedure can be used whereby the polymer and part of the ingredients are added first, and the remaining ingredients are added in additional increments. In one or more embodiments, two-stage mixing can be employed.

When utilizing an internal mixer, the dry or powdery materials such as the carbon black can be added first, followed by the processing aids and finally the polymer to form the masterbatch. The cure package (sulfur, accelerants, antidegredants, etc.) can be added near the end of the mixing cycle and at lower temperatures to prevent premature crosslinking of the polymer. In other embodiments, the cure package can be added to the masterbatch in order to improve dispersion.

Once mixed, the composition can be then formed into a sheet via calendaring or combined with a reinforcing cord-(fabric or metal). The compositions of the invention can also be formed into various types of articles using other techniques such as extrusion.

The vulcanizable compositions of the present invention can be formed into airsleeves of air springs by employing conventional techniques for fabricating and manufacturing air springs. Air spring and air sleeve constructions and methods of their manufacture are known in the art as exemplified in U.S. Pat. Nos. 7,250,203, 5,527,170, and 6,439,550, which are incorporated herein by reference.

In one or more embodiments, air springs prepared according to the present invention exhibit improved flex fatigue and crack growth resistance, when compared to air springs prepared from compositions that do not contain both saturated and unsaturated chlorinated polymers.

EXAMPLES

Five airsleeve compositions were prepared according to the recipes in Table 1, identified as Samples 1-5. The parts of each ingredient are by weight, unless otherwise specified. Specifically, each formulation was prepared within a laboratory-scale internal mixer using conventional two-stage mixing techniques commonly employed in the art of making rubber formulations for tire components. In general, the zinc oxide, sulfur, and cure accelerators were introduced and mixed into the formulation within the second mix stage, which was conducted at temperatures below which would otherwise cause a deleterious initiation of vulcanization. The saturated chlorinated polymer employed in Samples 2-5 had a chlorine content of about 35-36 wt. % and a Mooney viscosity of about 80.

The formulation was then sheeted on a two-roll mill to a thickness of about 0.075 inch or as otherwise required for particular molds for particular tests. For certain tests, the sheets were cured within a hydraulic press for 20 minutes at 155° C. Depending on the test specifications, test specimens were dye-cut to the desired shapes. Properties of the samples were tested, and the results are summarized below.

TABLE 1

| FORMULATION | Comparative Sample 1 | Sample 2 | Sample 3 | Comparative Sample 4 | Comparative Sample 5 | Comparative Sample 6 |
|---|---|---|---|---|---|---|
| Initial Mix | | | | | | |
| CPE | 0 | 5 | 10 | 10 | 10 | 10 |
| Neoprene | 100 | 95 | 90 | 0 | 0 | 0 |
| SBR | 0 | 0 | 0 | 90 | 0 | 0 |
| EPDM | 0 | 0 | 0 | 0 | 90 | 0 |
| BR | 0 | 0 | 0 | 0 | 0 | 90 |
| Carbon Black | 50 | 50 | 50 | 50 | 50 | 50 |
| Aromatic Oil | 10 | 10 | 10 | 10 | 10 | 10 |
| Wax | 2 | 2 | 2 | 2 | 2 | 2 |
| DOS | 10 | 10 | 10 | 10 | 10 | 10 |
| Processing Aid | 2 | 2 | 2 | 2 | 2 | 2 |
| Stearic Acid | 1 | 1 | 1 | 1 | 1 | 1 |
| Magnesium oxide | 4 | 4 | 4 | 4 | 4 | 4 |
| Antiozonant | 1 | 1 | 1 | 1 | 1 | 1 |
| Antioxidants | 1 | 1 | 1 | 1 | 1 | 1 |
| Initial Mix Total (phr) | 181.0 | 181.0 | 181.0 | 181.0 | 181.0 | 181.0 |
| Second Mix | | | | | | |
| Sulfur | 1.25 | 1.25 | 1.25 | 1.25 | 1.25 | 1.25 |
| TMTM | 0.5 | 0.5 | 0.5 | 0.5 | 0.5 | 0.5 |
| Zinc oxide | 5 | 5 | 5 | 5 | 5 | 5 |
| Final Total (phr) | 187.8 | 187.8 | 187.8 | 187.8 | 187.8 | 187.8 |
| MICRO DUMBELL TENSILE (23° C., FINAL, UNAGED) | | | | | | |
| Maximum Stress (MPa): | 17.6 | 17.3 | 16.1 | 10.8 | 11.7 | 8.9 |
| 100% Modulus (MPa): | 1.9 | 2.1 | 2.2 | 1.4 | 2.2 | 1.6 |
| 300% Modulus (MPa): | 10.2 | 10.4 | 10.5 | 4.8 | 5.7 | 4.7 |
| % Strain at Break: | 498 | 500 | 486 | 621 | 521 | 541 |
| MICRO DUMBELL TENSILE (100° C., FINAL, UNAGED) | | | | | | |
| Maximum Stress (MPa): | 8.0 | 7.4 | 7.2 | 3.9 | 3.5 | 3.8 |
| 100% Modulus (MPa): | 1.6 | 1.6 | 1.7 | 1.1 | 2.2 | 1.5 |
| 300% Modulus (MPa): | 7.0 | 7.2 | 7.2 | 3.9 | — | 3.8 |
| % Strain at Break: | 329 | 306 | 301 | 309 | 207 | 293 |
| MICRO DUMBELL TENSILE (23° C., FINAL, AGED 7 DAYS @ 70° C.) | | | | | | |
| Maximum Stress (MPa): | 17.9 | 17.1 | 16.4 | 10.4 | 8.6 | 8.0 |
| 100% Modulus (MPa): | 2.3 | 2.6 | 2.7 | 1.9 | 2.9 | 2.1 |
| 300% Modulus (MPa): | 12.0 | 12.3 | 12.4 | 6.6 | 7.3 | 6.5 |
| % Strain at Break: | 441 | 426 | 428 | 486 | 349 | 374 |
| MDR2000 (155° C., FINAL) | | | | | | |
| ML (dNm): | 1.3 | 1.4 | 1.4 | 1.1 | 1.3 | 1.4 |
| MH (dMn): | 11.2 | 12.0 | 11.4 | 9.9 | 19.5 | 13.1 |
| ts2 (min): | 8.6 | 9.0 | 9.5 | 10.0 | 7.6 | 7.8 |
| tc50 (min): | 15.7 | 16.5 | 16.5 | 11.5 | 13.1 | 9.3 |
| tc90 (min): | 36.9 | 36.7 | 36.5 | 19.2 | 31.4 | 13.4 |
| MOONEY (130° C., FINAL) | | | | | | |
| ML1 + 4 (MU) @ 130° C.: | 32.6 | 33.7 | 34.4 | 24.2 | 37.3 | 29 |
| MONSANTO FLEX FATIGUE (CAM = #24), POPULATION = 12 | | | | | | |
| Average | 78,200 | 85,217 | 191,524 | 96,770 | 44,940 | 40,138 |
| Standard Deviation | 39,016 | 40,943 | 86,022 | 45,718 | 27,017 | 25,912 |
| Weibull (B10) | 36,067 | 40,521 | 69,549 | 33,619 | 15,204 | 6,417 |
| CRESCENT-TEAR @ RT | | | | | | |
| Maximum Load (kN) | 0.08 | 0.08 | 0.08 | 0.07 | 0.06 | 0.06 |
| Elongation at Maximum Load (%) | 185 | 176 | 164 | 233 | 118 | 184 |
| CRESCENT-TEAR @ 100° C. | | | | | | |
| Maximum Load (kN) | 0.04 | 0.04 | 0.03 | 0.03 | 0.02 | 0.03 |
| % Strain at Break: | 112 | 107 | 96 | 122 | 39 | 90 |

Modulus and tensile strength were measured according to ASTM D 412 (1998), using an ASTM D4482 test specimen. Unaged samples were tested at 23° C. and at 100° C. Aged samples were also tested at 23° C., after having been aged for 7 days at 70° C.

Viscoelastic properties and cure time parameters were measured using a Monsanto MDR2000 moving die rheometer, according to ASTM D 5289.

Flex fatigue, sometimes referred to as fatigue to failure testing (f2f), was performed using a Monsanto™ "Fatigue to Failure" tester with a number 24 cam operating at 100 cycles per minute with modification to the test samples to accelerate testing. The test specimens were about 3 inches in length, about 0.5 inches wide at their widest width, and about 0.06 inches thick. The specimens according to ASTM D 4482 were generally dumbbell or dog bone shaped. The edges of the sample included a rib having a generally circular cross-section extending along the edge to help ensure that the sample would be adequately held within the testing device.

Crescent Tear was measured according to ASTM D 624.

It can be seen that Samples 2 and 3 provide improved flex fatigue, compared to Samples 1 and 4-6. Surprisingly, the overall elastomer cure behavior of Samples 2 and 3, which contain both saturated and unsaturated chlorinated polymers, is essentially equivalent to Sample 1. Samples 1, 2 and 3 exhibit a marching cure profile.

In one or more embodiments, air spring bellows prepared according to the present invention exhibit improved flex fatigue and crack growth resistance, while maintaining a favorable balance of other properties. In one or more embodiments, the present invention provides air spring bellows prepared according to a process comprising the steps of (i) preparing a vulcanizable composition that includes an unsaturated chlorinated polymer, and a saturated chlorinated polymer; (ii) fabricating an uncured air bellow comprising at least one layer that is formed from said vulcanizable composition; and (iii) at least partially curing the uncured air bellow. In one or more embodiments, the least one layer of bellows prepared according to the process of the present invention exhibit an average flex fatigue of at least 80,000, in other embodiments, at least 85,000, in other embodiments, at least 90,000, in other embodiments, at least 100,000, and in other embodiments, at least 120,000, when measured using a fatigue to failure tester equipped with a number 24 cam and operating at 100 cycles per minute.

In one or more embodiments, in combination with the above flex fatigue, the at least one layer of bellows prepared according to the process of the present invention exhibit a 300% modulus at 23° C., unaged, of at least 6 mPa, in other embodiments, at least 7 mPa, in other embodiments, at least 8 mPa, in other embodiments, at least 9 mPa, when measured according to ASTM D412 (1998) using a test specimen according to ASTM D4482.

In one or more embodiments, in combination with the above flex fatigue and 300% modulus, the at least one layer of bellows prepared according to the process of the present invention exhibit a maximum stress at 23° C., unaged, of at least 12 mPa, in other embodiments, at least 13 mPa, in other embodiments, at least 14 mPa, in other embodiments, at least 15 mPa, when measured according to ASTM D412 (1998) using a test specimen according to ASTM D4482.

In one or more embodiments, in combination with the above flex fatigue, modulus and maximum stress at 23° C., the at least one layer of bellows prepared according to the process of the present invention exhibit a 300% modulus at 100° C., unaged, of at least 4 mPa, in other embodiments, at least 5 mPa, in other embodiments, at least 6 mPa, in other embodiments, at least 7 mPa, when measured according to ASTM D412 (1998) using a test specimen according to ASTM D4482.

In one or more embodiments, in combination with the above flex fatigue modulus and maximum stress at 23° C., and 300% modulus at 100° C., the at least one layer of bellows prepared according to the process of the present invention exhibit a maximum stress at 100° C., unaged, of at least 4 mPa, in other embodiments, at least 5 mPa, in other embodiments, at least 6 mPa, in other embodiments, at least 7 mPa, when measured according to ASTM D412 (1998) using a test specimen according to ASTM D4482.

Various modifications and alterations that do not depart from the scope and spirit of this invention will become apparent to those skilled in the art. This invention is not to be duly limited to the illustrative embodiments set forth herein.

What is claimed is:

1. An air spring having an airsleeve, wherein at least one layer of said airsleeve includes the vulcanization product of a composition that includes
    an unsaturated chlorinated polymer; and
    a saturated chlorinated polymer where the saturated chlorinated polymer includes from about 10 to about 50 wt. % of chlorine, based upon the total weight of the saturated chlorinated polymer.

2. The air spring of claim 1, where the unsaturated chlorinated polymer includes unsaturated chlorinated polyolefin.

3. The air spring of claim 1, where the unsaturated chlorinated polymer includes unsaturated chlorinated polyethylene.

4. The air spring of claim 1, where the saturated chlorinated polymer may be characterized by a Mooney viscosity (ML1+4 at 100° C.) of from about 25 to about 150.

5. The air spring of claim 1, where the saturated chlorinated polymer may be characterised by a Mooney viscosity (ML 1+4/100° C.) of from about 40 to about 130.

6. The air spring of claim 1, where the saturated chlorinated polymer includes a homopolymer or copolymer of chloroprene.

7. The air spring of claim 1, where the composition comprises from about 5 to about 30 phr of a saturated chlorinated polymer.

8. The air spring of claim 1, where the weight ratio of saturated to unsaturated chlorinated polymer is from about 1:20 to about 1:1.

9. The air spring of claim 1, where the composition further comprises a sulfur-based curative.

10. The air spring of claim 1, where the composition further comprises at least 0.1 phr zinc oxide.

11. The air spring of claim 1, where the saturated chlorinated polymer includes less than about 1 wt. % sulfur.

12. The air spring of claim 1, where the saturated chlorinated polymer is devoid of sulfur.

13. An air spring having an airsleeve, wherein at least one layer of said airsleeve includes the vulcanization product of a composition that includes
    an unsaturated chlorinated polymer; and
    from about 5 to about 30 parts by weight per hundred parts rubber of a saturated chlorinated polymer.

14. The air spring of claim 13, where the unsaturated chlorinated polymer includes unsaturated chlorinated polyolefin.

15. The air spring of claim 13, where the unsaturated chlorinated polymer includes unsaturated chlorinated polyethylene.

16. The air spring of claim 13, where the saturated chlorinated polymer may be characterised by a Mooney viscosity (ML 1+4/100° C.) of from about 40 to about 130.

17. The air spring of claim 13, where the saturated chlorinated polymer includes from about 10 to about 50 wt. % of chlorine, based upon the total weight of the saturated chlorinated polymer.

\* \* \* \* \*